Figure 1:
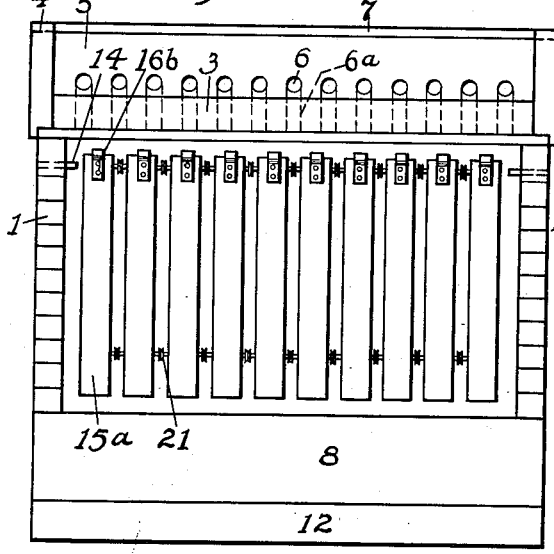

Nov. 4, 1941.  J. G. SILVER  2,261,298
BEEHIVE
Filed Nov. 27, 1939

Inventor
James G. Silver,
By G.C. Kennedy
Attorney

Patented Nov. 4, 1941

2,261,298

UNITED STATES PATENT OFFICE 2,261,298

BEEHIVE

James G. Silver, Imbler, Oreg., assignor of forty-eight per cent to William D. Terpany, Waterloo, Iowa Application November 27, 1939, Serial No. 306,269

9 Claims. (Cl. 6—1)

My invention relates to improvements in bee hives, and the principal object of my improvements is the construction of a hive with its entrance apertures in its top and which also serve as exits for bees, whereby the hive may have its brood chamber and brood frames in its upper part, with one or more chambers below for honey storage in other frames therewithin, and a basal clean-out chamber below the latter.

Another object of my improvements is to provide a plurality of removably supported brooder frames in the upper compartment, having associated removable frames arranged in a desired number therein, suitably spaced apart, and with each frame supplied with removable evenly spaced wire rods crossing them preferably vertically for carrying the wax deposited thereon by the bee carriers.

Another object of my improvements is to supply separable hanger connections between the upper interior opposite walls of the brood chamber as suspension means for the frames, with a removable cover or roof member for the chamber permitting deposit or extraction of the frames upwardly, whereby access may be obtained from above for placements or removals of the frames.

Another object of my improvements is to supply evenly spaced mutually end-contacting like devices between and crossing the interspaces of the removably suspended frames to keep them in evenly spaced alinement, and in parallelism.

Another object of my improvements is in constructing the top roofing or removable covering means for the brooder chamber, to have its parts relatively separable and without apertures except the plurality of entrance and exit apertures arranged in spaced alinement therealong above said frames transversely medially and for access conveniently in the coming and going of the bees.

Another object of my improvements is to associate with said brooder chamber a honey frame chamber below and in communication with it, with the honey frames arranged and supported removably and relatively crossing the brooder frames above, but with lesser interspaces, while also providing a communicating clean-out chamber below the honey frame chamber.

Another object of my improvements is to effect a complete reversal of the positions of the related chambers of my device, in order to better accommodate the activities of the bees at their work in going and coming to gather and deposit the requisite substances for and upon the respective brooder and honey carrying frames, and thus to also expedite their labors because of the easier respective placements, and without interference.

I have accomplished the above objects by the means which are hereinafter described and claimed, and also shown in the drawing, it being understood that various minor changes or improvements may be effected in the invention without departing from the principles thereof.

Figure 2:
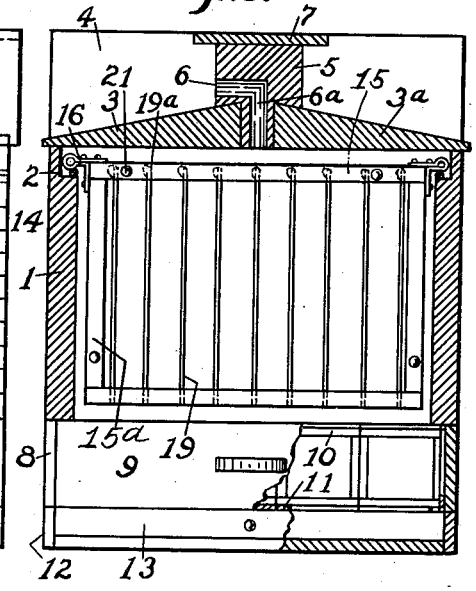
Figure 4:
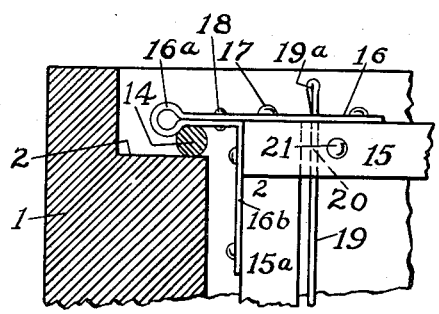
Figure 5:
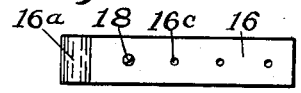
Figure 3:
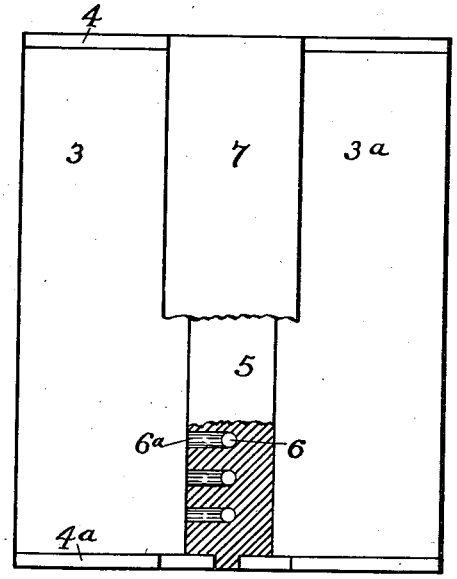

In the drawing, Fig. 1 is a front elevation of a bee hive according to my invention, with the front wall removed of the brooder chamber, and also exhibiting the top horizontally alined apertures or passages contrived to admit or allow the exit of bees to better distribute their loads or to depart from the device. Fig. 2 is a vertical transverse section of the hive of said Fig. 1, displaying a transverse brooder frame removably mounted thereacross, with portions of the end wall honey frame chamber and the cleaning-out chamber below, broken away. Fig. 3 is a top plan of the hive, with parts removed or broken away. Fig. 4 is an enlarged detail view in vertical cross section, of wall parts of the brooder chamber as broken away, and showing an upper corner portion of a brooder frame therein, with coacting means on the chamber broken away and other coacting means or hangers mounted on said frame in suspensions. Fig. 5 is a detail top plan view, of the same scale as that of Fig. 4, of one of the hanger brackets.

This applicant has discovered during his investigations, that in a state of nature bees prefer to deposit gathered wax or honey into an open upper part of a tree hollow as an entrance or exit in placing such deposits for convenience relative to each other, in order to avoid unnecessary labor with resulting exhaustion. Bee hives as heretofore assembled, have placed their entrances below the brooder chamber and also below the honey chamber, but the applicant in reversing this arrangement in principle, mounts the brooder chamber above the honey chamber or chambers, at the same time providing an easily removable top device having a row of horizontally arranged entrances above the brooder chamber and its contained removable brooder hangers, whereby the bees in a plurality may enter with their loadings to first deliver wax and mount it on the brooder frames, and later successively load the honey frames below.

The relative arrangements of the applicant's devices in the hive shown are displayed in Figs. 1 and 2, with the top or cover parts shown in Figs. 1, 2 and 3. Referring first to Figs. 2 and 3, the numerals 3, 1, 8 and 12 in vertical separable superposition, show the basal cleaning-out chamber 12, upon which is supported the honey-comb chamber 8, with the brooder chamber 1 thereupon, and terminating with a sectional roof assembly at 3. The cleaning-out chamber 12 and the honey-comb chamber 8 are of the usual patterns, the former having a removable closure 13, and the latter being open at top and bottom and having therein cross-bars 11 supporting the usual closely set rows of rectangular open frames 10 within which comb containing honey is removably seated. This section 8 may be removed from between the lower chamber 12 and the brooder chamber 1, and one or more honey chambers inserted. The numerals 3 and 3a denote like but relatively reversed outwardly beveled roof members removably mounted upon the open top chamber 1, the members 3 and 3a being spaced apart longitudinally as shown in Fig. 2. End boards 4 are recessed on their lower inner faces to seat across the roof members 3 and 3a. A medial longitudinal block 5 is shaped at the bottom longitudinally to seat upon adjacent parts of the roof members 3 and 3a, and has a bottom medial longitudinal part removably seated in the interspace of the members 3 and 3a. A medial longitudinal top board 7 is positioned upon the block 5 with ends seated in medial recesses in the opposite end boards 4. As shown in Fig. 2, also in Fig. 3, angular passages, horizontal at 6 and communicating with vertical parts 6a, are formed in a desired plurality in and partially across the block 5, opening outwardly at 6 and opening inwardly at 6a.

The top parts of the inner longitudinal walls of the brooder chamber (see Fig. 2) are channeled at 2, and a like pair of rods 14 (Figs. 2 and 4) have their extremities seated in opposite holes in the end walls close to the channels 2.

In Fig. 1 is shown a plurality of brooder frames 15a—15 each corner connected in each case rigidly, and metal brackets 16—16b (see Fig. 4) are secured by nails 17 through holes in their members 16 and 16b to the upper left and right corners of the frame 15—15a. The medial part of each bracket is bent to extend over the wall ledge at 2, out of contact, and at the circular bend seated across the adjacent longitudinal rod 14 removably. In Figs. 4 and 5 is shown the bracket 16—16b, on a larger scale in Fig. 5, with the eyed part 16a and its stem connected in its parts by a rivet 18. The brooder frames may thus be lifted out of the brooder when desired.

I have provided a plurality of tempered wires or pins 19 (Figs. 2 and 4) seated removably in vertically alined holes in the upper and lower cross bars 15, the pins, if desired, having upset upper ends to serve as stops 19a, removable upwardly. The bees build up their wax structures upon and across said wires or pins 19.

Referring to Fig. 1, the plurality of evenly spaced depending frames shown in end elevation at 15a are kept apart in a predetermined spacial relation by headed pins 21, and contacting with each other. The interspaces of the frames are relatively wide to permit the passage of a queen bee therebetween at times, whereas the honey frames 10 are usually spaced more closely apart in facing each other in the honey compartment 8.

As bees traverse the channels 6—6a downward, they first apply wax to the brooder cells in the upper frames 15—15a, which shortens their travel in this work as compared to having to enter the hive at or near its bottom part to next ascend through the honey compartment to enter a brooder chamber, lengthening their trips thereto.

It should be noted that one or more honey supers may be placed under the brood chamber without mounting any queen excluder between them. The queen will seldom, if ever, enter a super which contains section boxes, because their spacings are so close that the queen cannot enter them, so that no queen excluder is necessary. The worker bees, however, being smaller, have free access to all parts of the hive, while the workers with my constructions have the advantage of going downward with their loads, instead of having to ascend from below upwardly when they arrive almost exhausted.

In my type of hive, the entrances are directly over the frames medially, eliminating the necessity of the bees building "burr comb" (little stools of wax) on the inner wall of the hive or on the sides of the combs near the walls, in order to make little bridges on which to pass from the inner walls to the frames in going to and from their work, and also such little bridges are very annoying to the apiarist when removing or replacing frames in a hive. It is obvious that when the bees descend from the entrances along the top of the hive, they pass right to its center line and to the tops of the frames, and can go either way to that part of the frame on which they work without going to the wall, so that it is unnecessary for them to build such little bridges.

The bottom chamber 12 is not an entrance, but is kept closed, except when opened to remove any refuse from the work of the bees. In case the bees need feed, the chamber closure door 13 may be removed, and a frame or receptacle of honey or sugar substitute inserted, without danger to the bees. In case of entrance of a robber bee which devours a quantity of honey, it will then be attacked by the worker bees and dragged to the bottom of the hive and destroyed thereby in the chamber 12.

In order to remove honey from the hive, the brood chamber 1 may be raised sufficiently to allow the slipping out of filled supers, after inserting a bee escape board between the brood chamber and the chamber below, then empty frames may be inserted when the escape board is removed, and it is thus unnecessary to remove the cover. The metal brackets 16 at each end of the top bar of the frame 15 may be slightly rounded where they contact the rods 14, to keep them plumb.

The bees are thus enabled to begin a comb on a narrow strip of foundation (called a "starter") in the center of the top bar, and as bees build their combs vertically downward, they will always finish the comb in the center of the bottom bar. When the comb is thus sealed to the bottom bar, it will hold its quota of the weight when the comb is filled with honey. The metal brackets 16—16b at both ends of the frame 15—15a being fastened to both the top bar and side and bars of the frame 15 and 15a put most of the weight of the frame and comb on the end bars, preventing sagging of the top bar with the weight.

The top medial apertures for entry and exit are believed to be an unique means for preventing swarming without the necessity of destroying queen cells, as it is very seldom that bees swarm when there is room for comb building in the lower part of the hive. If combs mounted over the brooder are filled with honey and sealed, the interspaces between the combs are too narrow to permit the free passage of the queen bee from one frame to the other, which is a primary cause for swarming. By my use of entrances at the top of the hive, there is no necessity for sealing honey over the brooder. Bees do not seal honey near the entrance, nor do they build the combs as thick near the entrance as they do farther away from it, and because it is essential that air may freely pass to and from the brooder nest, the queen bee must have ample room to pass over and between all the frames at their tops. This will reduce the liability of the bees building queen cells, which promotes swarming.

The pair of metal rods 14 extending through the hive at each side serve both to bind the brooder chamber securely together, but also provide a suitable rest for the frames.

The cap 7 over the entrance member 5 keeps rain or snow from entering the hive, while the roof parts 3 and 3a which slope outwardly oppositely from the member 5 provides large and convenient alighting boards for the bees.

I claim:

1. In a bee hive, in combination, an oppositely outwardly sloping roofed inclosure having vertical roof apertures in spaced alinement medially therealong, and a cap bar fitted removably thereupon and apertured horizontally to communicate with the apertures of the roofed inclosure to serve as either inlets or outlets for bees.

2. In a bee hive, in combination, a walled inclosure, a sectional roof removably mounted thereon having a longitudinal row of angular apertures, each serving as an inlet or an outlet for bees, and a plurality of longitudinally spaced frames removably hung within the inclosure for supporting waxen cells therein immediately adjacent to the apertures.

3. In a bee hive, in combination, a removable sectional roof structure therefor having a plurality of like and alined apertures, aligned medially therealong and a plurality of open frames below the apertures, the apertures being directed angularly to open downwardly into the hive to serve solely as both inlet and outlet passages for bees directly to and from said apertures.

4. In a bee hive, the combination, a removable roof structure therefor having a plurality of like and medially alined apertures directed to open downwardly into the hive to solely serve as both inlets and outlets for bees, and the roof being shaped anticlinally with said apertures alined lengthwise along its ridge to open into the hive.

5. In a bee hive, in combination, a removable roof structure having a longitudinal block mounted medially therealong and provided with apertures leading downwardly therethrough into the hive, anticlinal roof elements spaced apart with the apertured part of the block mounted therealong and fitted therebetween removably to open within the hive, and a canopy member mounted upon and along said block to project laterally therefrom.

6. In a bee hive, in combination, a removable roof structure having relative anticlinal members spaced apart, and a closure block between them having alined apertures therealong for bee passages to and from the hive.

7. In a bee hive, in combination, a removable roof structure having relative roof members spaced apart, a closure block fitted between them and rising thereabove, and said block having alined angular like passages therethrough and therealong leading from without and into the hive.

8. In a bee hive, in combination, a sectional roof structure having apertures therethrough and removably secured on the hive, transversely spaced longitudinal rods adjacent to the inner side walls of the hive and end-seated in the end walls thereof, and hollow longitudinally spaced frames having outwardly directed brackets with end rings disposed in a vertical plane, hung engagingly and removably on said rods.

9. In a bee hive, in combination, a housing having a roof removably mounted thereon, and apertured for the entrance or exit of bees, a plurality of open rectangular frames in said housing in longitudinal alinement spaced apart, wire division devices releasably connecting the upper and lower bars of the frame, horizontal rods positioned adjacent the side walls of and within the housing and end-secured to the end walls thereof, brackets projecting fixedly from the outer upper angled parts of the frames and shaped terminally to rest upon said rods in engagement therewith to hold them in alinement thereon removably, and end-contacting spacing devices on facing parts of the frames to maintain them in equally spaced alinement.

JAMES G. SILVER.